(12) United States Patent
Nyberg et al.

(10) Patent No.: US 6,198,736 B1
(45) Date of Patent: Mar. 6, 2001

(54) TELECOMMUNICATIONS SYSTEM

(75) Inventors: Henrik Nyberg, Hägersten (SE); John Mark Freeze, Raleigh; Randall Glenn Bright, Pittsboro, both of NC (US); Tomas Östman, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/015,952

(22) Filed: Jan. 30, 1998

(30) Foreign Application Priority Data

Jan. 31, 1997 (GB) .................................................. 9702026

(51) Int. Cl.⁷ ...................................................... H04J 3/06
(52) U.S. Cl. .......................... 370/350; 370/324; 370/510; 370/514
(58) Field of Search ..................................... 370/324, 509, 370/503, 510, 514, 350; 375/354, 358, 359, 356

(56) References Cited

U.S. PATENT DOCUMENTS

| | | | |
|---|---|---|---|
| 3,641,274 | * | 2/1972 | Sasaki et al. .......................... 370/324 |
| 4,592,050 | | 5/1986 | Bensadon . |
| 5,440,562 | | 8/1995 | Cutler, Jr. . |
| 5,473,668 | | 12/1995 | Nakahara . |
| 5,666,366 | * | 9/1997 | Malek et al. .......................... 370/505 |
| 5,715,521 | * | 2/1998 | Fukasawa et al. ...................... 455/69 |
| 5,953,637 | * | 9/1999 | Coons et al. .......................... 455/11.1 |

FOREIGN PATENT DOCUMENTS

| | | |
|---|---|---|
| 0 164 758 | 12/1985 | (EP) . |
| 0 236 968 | 9/1987 | (EP) . |
| 0 576 079 | 12/1993 | (EP) . |
| 0634851A2 | * 1/1995 | (EP) . |
| 0 634 851 | 1/1995 | (EP) . |
| 2 298 107 | 8/1996 | (GB) . |
| 6-268690 | 9/1994 | (JP) . |
| 7-162473 | 6/1995 | (JP) . |
| 94/18764 | 8/1994 | (WO) . |
| 95/10920 | 4/1995 | (WO) . |
| 96/38990 | 12/1996 | (WO) . |
| 96/39762 | 12/1996 | (WO) . |
| 0 751 634 | 1/1997 | (WO) . |

* cited by examiner

Primary Examiner—Hassan Kizou
Assistant Examiner—Mitchell Slavitt
(74) Attorney, Agent, or Firm—Burns, Doane, Swecker & Mathis, L.L.P.

(57) ABSTRACT

An air frame synchronisation signal is transmitted as a data signal over a PCM link from a central unit to a plurality of remote radio transceivers, allowing the remote radio transceivers to recreate the AFS signal with the desired accuracy, compensating for transmission delays.

40 Claims, 8 Drawing Sheets

TELECOMMUNICATIONS SYSTEM

TECHNICAL FIELD OF THE INVENTION

This invention relates to a telecommunications system, and in particular to a network comprising a base station with a control unit and a plurality of remote radio transceivers and to a method of establishing air frame synchronisation between the remote radio transceivers.

DESCRIPTION OF RELATED ART

A conventional digital cellular telephone base station includes a large number of radio transceivers, typically controlled from a central unit. Transmissions from the radio transceivers are divided into frames, and each frame contains a plurality of time slots, which typically contain transmissions to different mobile transceivers. A time division multiplex (TDM) link is used for carrying control and traffic signals between the control unit and the remote radio transceivers.

It is known to synchronise the radio transceivers, so that each radio transceiver begins transmission of a new frame at the same moment. In a conventional network, air frame synchronisation between the radio transceivers is established by means of a central timing unit, which is connected to all of the radio transceivers via a local bus cable network, and transmits a signal at 25 Hz, which is the air frame rate, to the radio transceivers.

However, this method of distributing the air frame synchronisation signals is disadvantageous when the radio transceivers are at a significant distance, for example up to 1,000 m, from the central timing unit, since then the propagation delays along the cable mean that true synchronisation can be lost and a separate cable is necessary for the air frame synchronisation signal.

SUMMARY OF THE INVENTION

The present invention seeks to provide a method of distributing air frame synchronisation between widely spaced radio transceivers, without requiring additional infrastructure.

In preferred aspects of the present invention, the air frame synchronisation signal is transmitted to the remote radio transceivers on the TDM link which carries the traffic and control signals. Preferably, data relating to the air frame synchronisation signal is encoded and transmitted in a time slot on the TDM link, and each remote radio transceiver includes circuitry for regenerating the air frame signal from the transmitted data.

Preferably, also, the remote radio transceiver includes circuitry for compensating for any delays on the transmission link.

DETAILED DESCRIPTION OF PREFERRED EMBODIMENT

Figure 1:
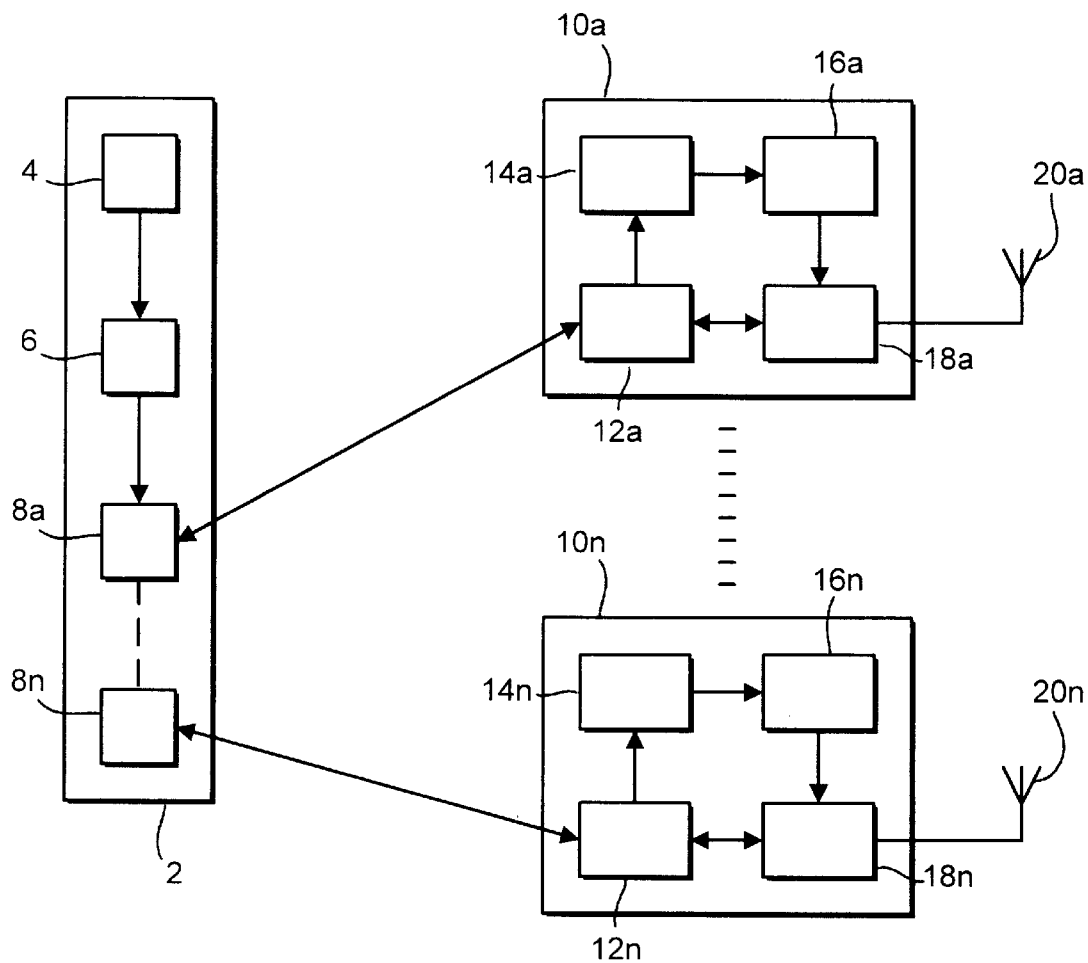
FIG. 1 is a schematic representation of a network in accordance with the invention.

FIG. 1 is a schematic representation of a network in accordance with the invention. A central unit 2 comprises a master air frame synchronisation (AFS) oscillator 4, which is connected to an AFS digital encoder block 6, which in turn is connected to a plurality of digital interfaces 8a, . . . , 8n. Each of the digital interfaces is connected over a respective TDM (or time division multiplexed) link, also referred to herein as a pulse code modulated (or PCM) link, to a respective remote radio transceiver 10a, . . . 10n. Each remote radio transceiver comprises a respective digital interface 12a, . . . , 12n, which is connected to an AFS digital decoder block 14a, . . . , 14n, which in turn is connected to a slave AFS oscillator 16a, . . . , 16n. The digital interface 12a, . . . , 12n is also connected to a radio transceiver 18a, . . . , 18n, which in turn is connected to an antenna 20a, . . . , 20n. The AFS oscillators 16a, . . . , 16n are also connected to feed their outputs to the respective radio transceivers 18a, . . . , 18n.

In the central unit 2, the master AFS oscillator 4 is conventional, and will not be described further herein. Similarly, the digital interfaces 8a, . . . , 8n are conventional, and will not be described further.

In accordance with the invention, the AFS encoder 6 is responsible for generating data relating to the phase of the AFS signal, relative to the frames of data sent from the interfaces 8a, . . . , 8n to the respective remote radio transceivers 10a, . . . , 10n. This encoded data is then sent to a framer via, in this specific arrangement, a processor (not shown), which incorporates the data into the signals being transmitted on the respective PCM links. In other implementations of the invention a processor would not be required.

Specifically, with the AFS oscillator 4 being run from a 19.44 MHz clock, the encoder 6 is responsible for measuring the number of these 19.44 MHz cycles that separate the beginning of an AFS frame from the beginning of one of the frames in the signals sent on the PCM link.

Figure 2:
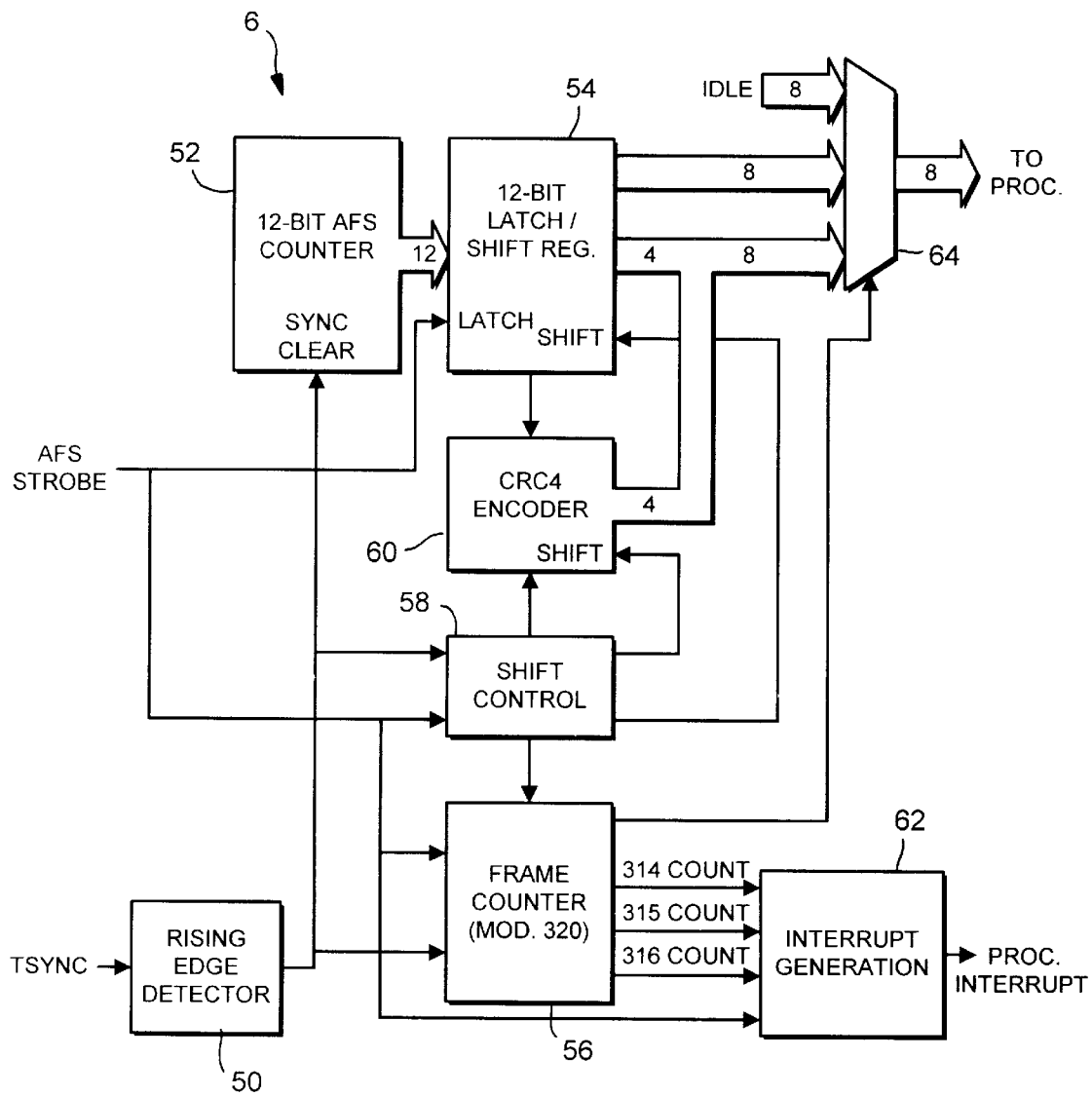
FIG. 2 is a schematic block diagram of a part of the central unit in the network.

FIG. 2 is a block diagram of the AFS encoder 6.

The AFS encoder 6 receives an input TSYNC, which is an 8 kHz signal derived from the transmit clock and is coincident with the start of the TDM frame. The signal TSYNC is sent to a rising edge detector 50, which generates pulses on the rising edges of the signal TSYNC. Each pulse is sent to a 12 bit AFS up counter 52. The AFS counter 52 is run from the 19.44 MHz clock, and counts the number of clock cycles since its last reset. The counter 52 is reset by every pulse from the edge detector 50. A shift register 54 receives a latch input AFS strobe, which is generated by the falling edges of the 25 Hz AFS signal. When an AFS strobe occurs, the count from the AFS counter 52, which is the counted number of 19.44 MHz clock cycles since the beginning of a PCM frame until the beginning of an AFS frame, is latched into the 12 bit shift register 54. This count is referred to as the air frame offset. The PCM frame in which this occurs is considered frame 0 and a modulo 320 frame counter 56 is set to 1 at the next TSYNC pulse, and counts each subsequent pulse.

After the AFS count is latched into the shift register 54, a shift control counter 58 shifts the AFS count value through a CRC4 encoder 60. After 16 shifts (12 bits of the AFS count and 4 zeros) the CRC value is available from the CRC encoder. When the frame counter 56 reaches 314, an interrupt is generated by an interrupt generator 62 at the very end of frame 314. The processor (not shown) then reads the most significant byte, referred to below as "B", of the 12 bit value from the shift register 54 via a multiplexer 64, which is controlled by decoding the frame count from the frame counter 56. The processor writes the value read from the multiplexer 64 to the transmit idle definition register of a Dallas 2151 DS1 framer which will transmit this byte in a separate AFS time slot (e.g. time slot 1) of the next frame (frame 316). Another interrupt is generated by the interrupt generator 62 at the end of frame 315. This interrupt causes the processor to read the least significant 4 bits of the data stored in the shift register 54 and the 4 bit CRC (cyclic redundancy check) value, together referred to below as the byte "C", via the multiplexer 64, and writes it to the idle definition register of the framer. A third interrupt is generated at the end of frame 316. This interrupt causes an 8 bit idle code, referred to below as "A", to be read by the processor via the multiplexer 64 and written to the framer. The framer will transmit this idle code in every frame until the next AFS event.

Figure 3:
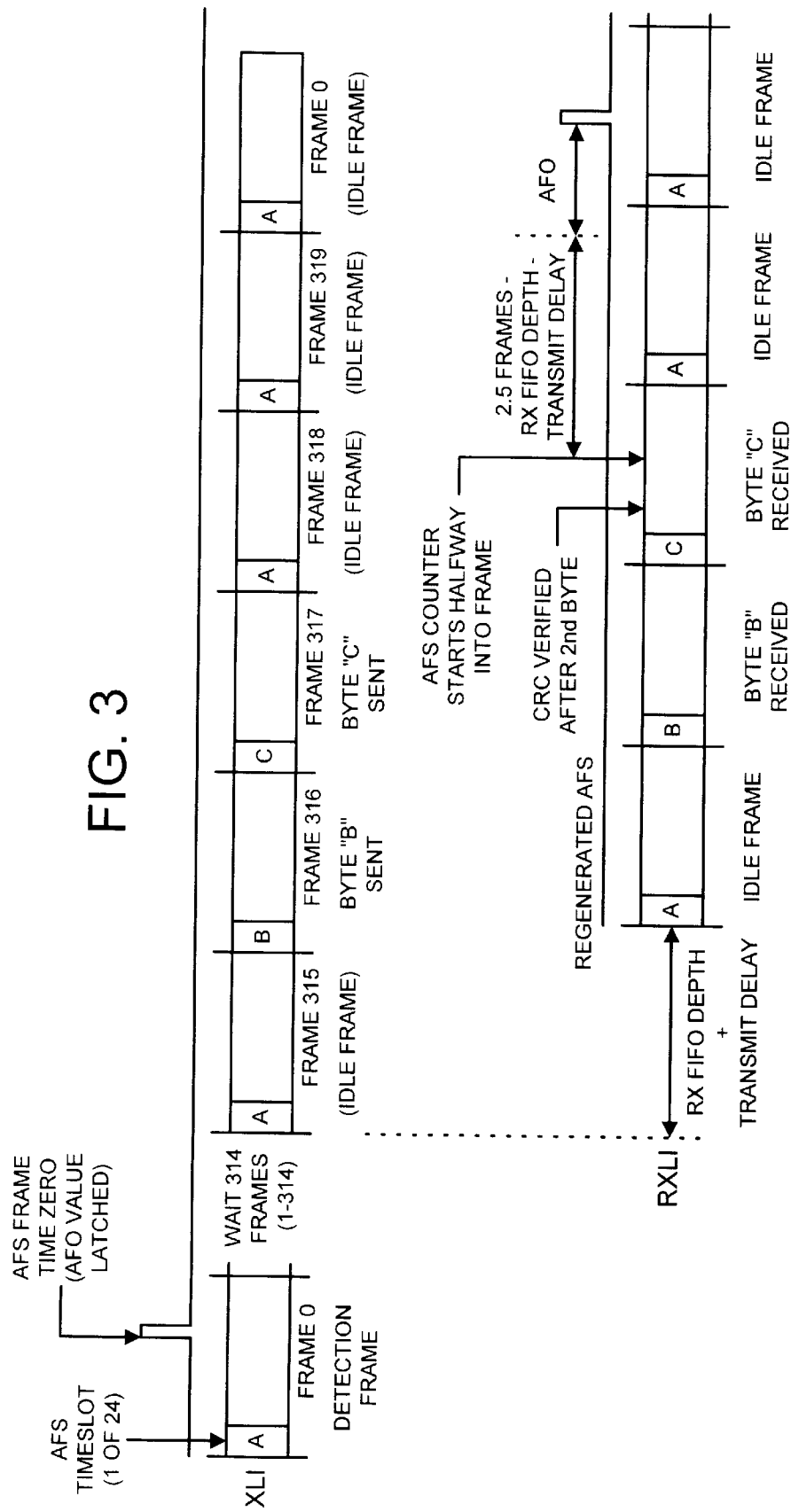
FIG. 3 is a timing diagram illustrating the invention.

FIG. 3 illustrates, in the top line marked XLI, the AFS data transmitted on the PCM link. As is conventional, transmissions on the PCM link are divided into a succession of frames, and each frame is divided into 24 time slots. In this case, the first time slot carries the AFS data, and is referred to as the AFS time slot.

As mentioned previously, the frame rate on the PCM link is 8 kHz, while the AFS frequency is 25 Hz. Thus, there is one AFS cycle every 320 PCM frames. The beginning of an AFS cycle is referred to as AFS frame time zero, and is the point in time at which an AFS Strobe signal occurs, and it is at this point that the value from the AFS counter 52 is latched into the shift register 54. The PCM frame during which this occurs is referred to as frame 0. As discussed above, idle codes "A" are transmitted during the AFS time slots of each of frames 1–315. Then, the most significant byte "B" is transmitted during the AFS time slot of frame 316, and the least significant byte "C" is transmitted during frame 317. Idle codes "A" are then transmitted during the remaining frames until the cycle repeats.

As shown in the lower line marked RXLI of FIG. 3, signals transmitted on the PCM link are received at the relevant remote radio transceiver after a time delay, which depends amongst other things on the physical separation of the remote radio transceiver from the central unit. To ensure that all of the remote radio transceivers are accurately synchronised with one another, and with the AFS signal generated in the central unit, it is necessary to compensate in each radio transceiver for the respective time delays. As a result of these time delays, the bytes "B" and "C" are transmitted on the PCM link several frames before the next AFS frame time zero, and the receiving remote radio transceiver is then able to act on the received data by generating its own AFS, with a frame time zero at a point determined by a known transmission delay, taking into account the measured time by which the transmission of bytes "B" and "C" precede the beginning of the new frame 0, and the transmitted data which relates to the time difference between the beginning of frame 0 and the required AFS frame time zero.

The transmit delay is approximately 16 $\mu$s for a cable length of 0, and 23 $\mu$s at a cable length of 1,000 m.

Moreover, there are delays once the signal has reached the remote radio transceiver, due to the presence of an elastic store (as described hereafter), which can introduce a delay of up to two TDM frames.

In this illustrated embodiment, the expected time delays are such that it is sufficient to send bytes "B" and "C" in frames 316 and 317, as this gives sufficient time for the receiving remote radio transceiver to act on the received data, even with the longest conceivable transmission delays. In networks which might have longer transmission delays, it might be necessary to transmit the AFS data earlier in the cycle.

In regenerating the AFS signal, the remote radio transceiver uses the middle of frame 317, in which the second byte "C" of the AFS data is received, as its reference point. From this point, the base station counts 312.5 $\mu$s (equivalent to two and a half TDM frames, i.e. the separation of the reference point from the beginning of frame 0), plus the time determined by the decoded AFS data, minus a transmission delay factor, and minus the elastic store depth. The remote radio transceiver must also compensate for the startup delay required to resynchronise the AFS generator after a signal is sent to it.

Figure 4:
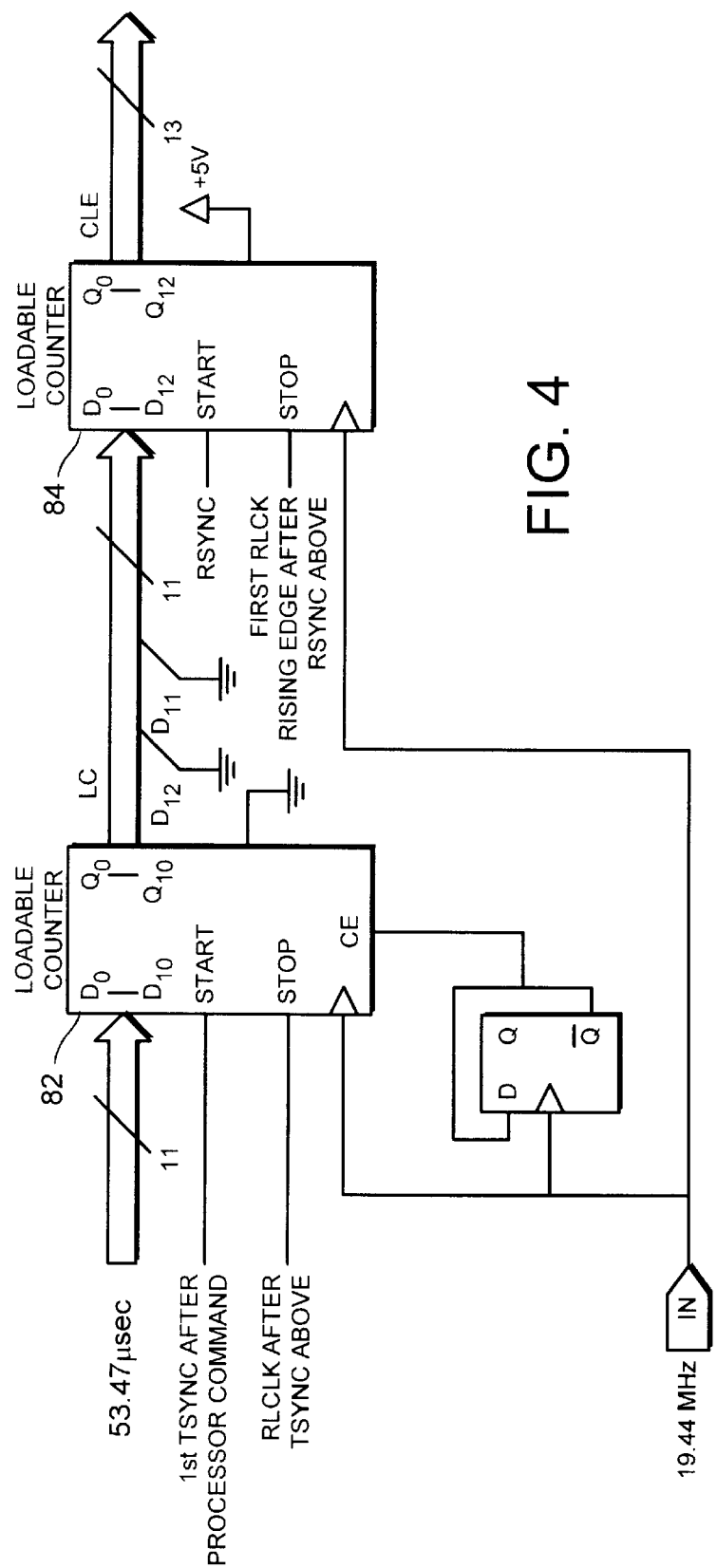
FIG. 4 is a schematic diagram of a part of a base station.

FIG. 4 shows the circuitry present in the remote radio transceiver for compensating for the transmission delay and the elastic store depth.

This circuit uses inputs which are determined by the network parameters.

Figure 5:
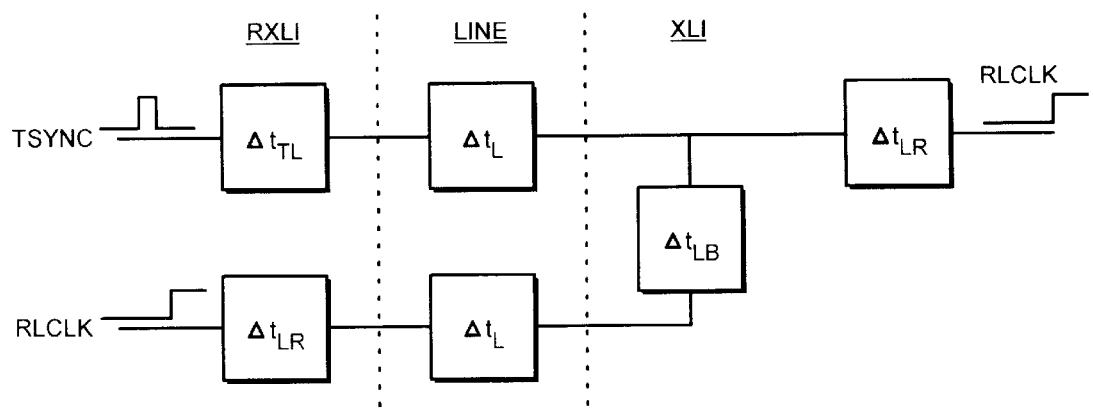
FIG. 5 represents the delays which occur when transmitting signals in the network.

FIG. 5 illustrates the way in which the transmission delay is determined. A signal is sent from the remote radio transceiver, marked RXLI, over the transmission line to the central unit, marked XLI, which is placed in loopback mode, so that the same signal is received again at the remote radio transceiver. The remote radio transceiver then measures the time taken for the round trip.

In FIG. 5:

$\Delta t_{TL}$=Delay from TSYNC to Line $\Delta t_L$=Propagation Delay of Line $\Delta t_{LR}$=Delay from Line to RLCLK, where RLCLK marks the receive TDM frame boundary before the elastic store as described later $\Delta t_{LB}$=Loopback Delay $\Delta t_L$ depends on the distance between the central unit and the remote radio transceiver, but the other parameters are fixed by the network hardware. The fixed delays (measured for Dallas 2151) are:

$\Delta t_{TL}$=6.88 $\mu$s $\Delta t_{LR}$=9.48 $\mu$s $\Delta t_{LB}$=1.38 $\mu$s The remote radio transceiver RXLI can only make a round trip measurement. As can be seen from FIG. 5, this takes a time $\Delta t_{Round\ Trip}$, given by:

$$\Delta t_{Round\ Trip}=\Delta t_{TL}+\Delta t_L+\Delta t_{LB}+\Delta t_L+\Delta t_{LR}$$

Solving for $\Delta t_L$:

$$\Delta t_L=\tfrac{1}{2}(\Delta t_{Round\ Trip}-\Delta t_{TL}-\Delta t_{LB}-\Delta t_{LR})$$

The transmission delay factor, TxDelay, which needs to be taken into account when regenerating the AFS signal, is:

$$\text{TxDelay}=\Delta t_{TL}+\Delta t_L+\Delta t_{LR}$$

Substituting for $\Delta t_L$, $$\text{TxDelay}=\tfrac{1}{2}(\Delta t_{Round\ Trip})+\tfrac{1}{2}(\Delta t_{TL}+\Delta t_{LR}-\Delta t_{LB})$$

Substituting for the fixed values indicated above, $$\text{TxDelay} = \tfrac{1}{2}(\Delta t_{Round\ Trip}) + 7.49\ \mu s.$$

Figure 6:
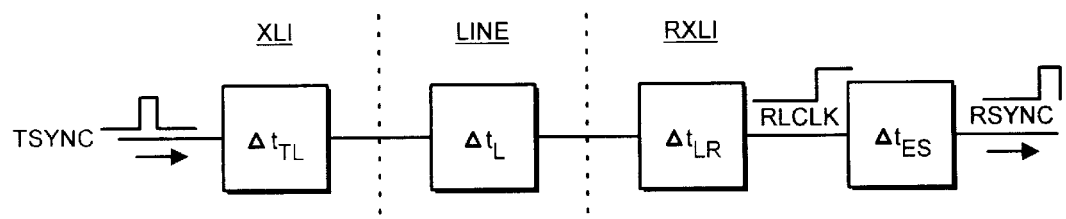
FIG. 6 further represents the delays which occur when transmitting signals in the network.

FIG. 6 shows the sources of the delays which arise between the transmission of the data, and the time when the data is received in the remote radio transceivers in a form in which it can be used. In FIG. 6, $\Delta t_{TL}$, $\Delta t_L$ and $\Delta t_{LR}$ have the same meanings as in FIG. 5, while $\Delta t_{ES}$ is the elastic store delay, or elastic store depth.

Figure 7:
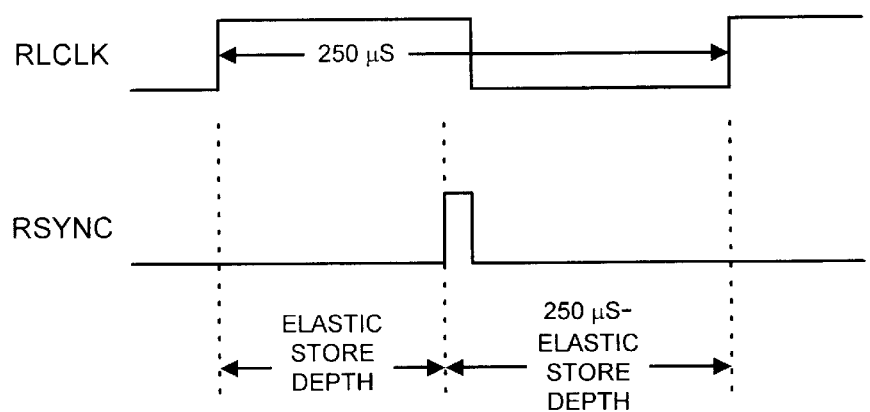
FIG. 7 is a timing diagram illustrating an aspect of the invention.

The elastic store is essentially a variable depth FIFO and is used to rate adapt the 1.544 Mbps PCM line data to the phase locked 2.048 Mbps data rate generated at the remote radio transceiver. The elastic store depth can vary between 0 and 250 µs, and cannot be forced to a known depth with the Dallas 2151 framer. In order to compensate for this variable delay, the remote radio transceiver measures the elastic store depth occurs every 24 TDM frames. The Dallas 2151 T1 framer is configured such that RSYNC occurs only at 24 TDM frames and RLCLK is high for one TDM frame. RSYNC marks the TDM frame after the elastic store. The timing relationship between RLCLK and RSYNC is shown in FIG. 7.

To compensate for the elastic store depth, the term (250 µs–Elastic Store Depth) is needed.

Thus, the time delay which the remote radio transceiver must apply, after receiving the transmitted data in usable form, and taking the midpoint of the frame in which the second byte "C" is received as its reference point is given by:

[62.5 µs–TxDelay–1.54 µs]+[250 µs–Elastic Store Depth]+Air Frame Offset (where 1.54 µs is the startup delay required to resynchronise the AFS generator).

By substituting for TxDelay, the term:

[62.5 µs–TxDelay–1.54 µs], referred to herein as LC, simplifies to:

$$LC = 62.5\ \mu s - \tfrac{1}{2}(\Delta t_{Round\ Trip}) - 7.49\ \mu s - 1.54\ \mu s = 53.47\ \mu s - \tfrac{1}{2}(\Delta t_{Round\ Trip})$$

The value of LC needs to be updated only on power up and after loss of signal situations via a processor command and is found, referring to FIG. 4, using a down counter 82, with the central unit in remote loopback.

The counter 82 is run from a 19.44 MHz clock, and receives as an input a signal which corresponds to the time of 53.47 µs, as derived above. The counter is started by the first TSYNC pulse received after the processor command and is stopped by the RLCLK pulse received after that TSYNC pulse. The output count value LC is thus generated, and sent as input to a second counter 84, which is used to take into consideration the elastic store depth as discussed above.

As described above with reference to FIG. 7, the term [250 µs–Elastic Store Depth] is the time between the rising edge of a RSYNC pulse and the next rising edge of the RLCLK signal. Thus, the value of LC is loaded into the counter 84, which then starts counting on the rising edge of the RSYNC pulse, until the next rising edge of the RLCLK signal. The output signal CLE then takes into consideration the transmission delay and the current elastic store depth.

The circuit of FIG. 4 uses signals recovered by the framer chip, namely the incoming clock (RCLK) and frame boundaries (RLCLK), obtained by sampling the data with a high speed clock. These signals have jitter due to the sampling. RLCLK may have up to almost 200 ns peak to peak of jitter. If the output CLE of the circuit above was used directly, this alone would add 200 ns of jitter to the AFS signal. To eliminate jitter, the CLE value must be stabilized. This is accomplished using the circuit of FIG. 8. A calibrated version of the output, CAL, is maintained and stored in a register 92. Each time the current value CLE is updated, it is compared to the calibration value CAL in a subtractor 94. If the absolute value of the difference between the current value CLE and calibration value CAL established in block 96, is greater than 360 ns, as determined by a comparator 98, the calibration value CAL is updated, which effectively adds hysteresis to the system.

Figure 9:
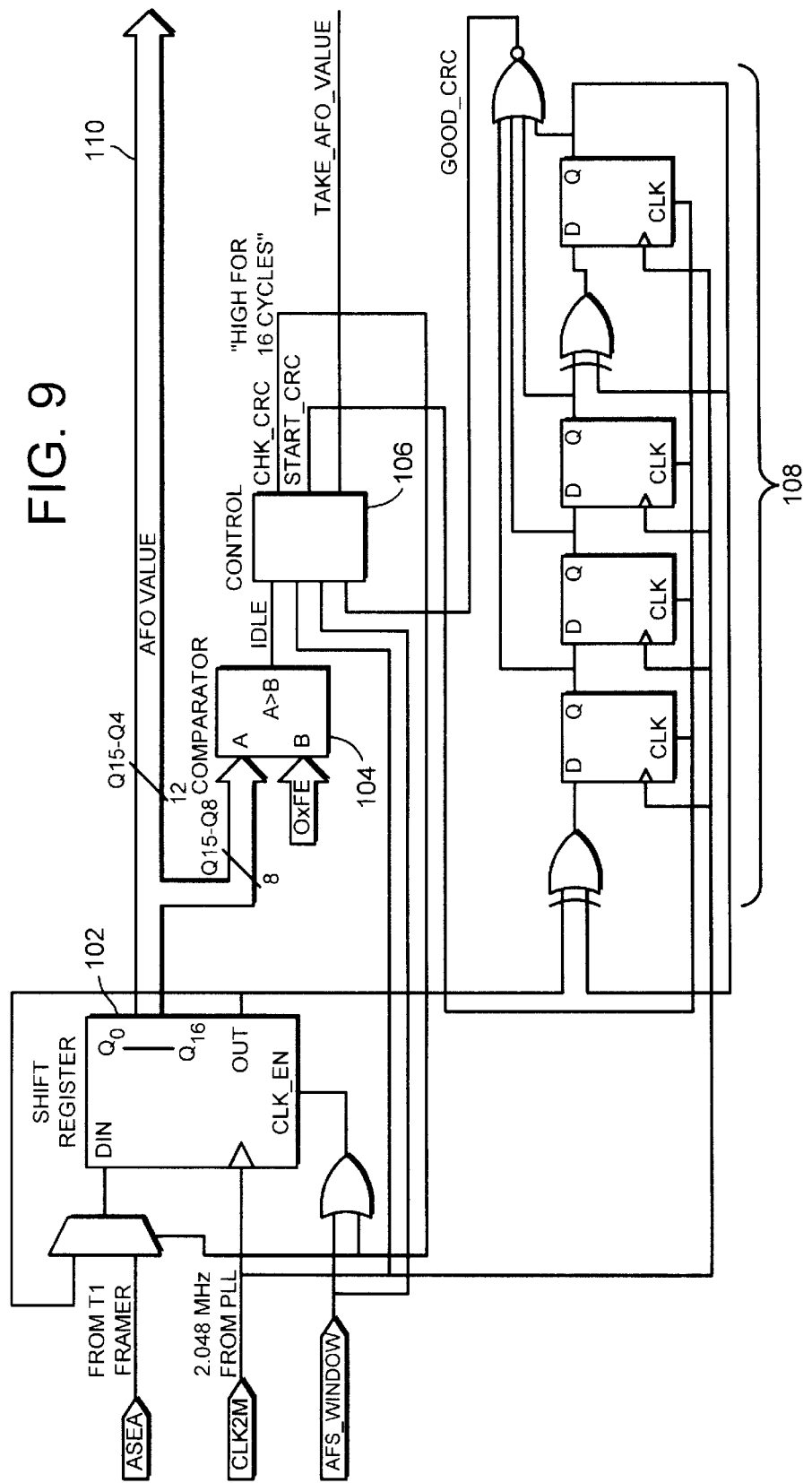
FIG. 9 is a schematic diagram of a further part of a remote radio transceiver.

FIG. 9 shows the circuitry used to recover and perform verification on the Air Frame Offset (AFO) value transmitted on the PCM link. During each frame, a new byte of data is received during the AFS time slot and is shifted into a 16 bit shift register 102, and the upper byte is compared in a comparator 104 with the idle code "A" discussed earlier. The result of the comparison is sent to a controller 106. In the event that the upper byte is not the idle code, the controller assumes that it is an AFO value, and starts the CRC check. The most significant bit of the shift register is looped back to the least significant bit, and is also routed to the CRC checker 108. The shift register and CRC checker 108 are clocked 16 times, such that, at the end of this process, all of the data is in its original position in the shift register and has passed through the CRC checker 108. If all output bits of the CRC checker are 0, the check has passed, and a signal is sent back to the controller 106 causing the AFO value on the output 110 to be used to recreate an AFS signal. If any bit of the CRC checker is not 0, the check is deemed to have failed, and the AFO value is ignored.

Figure 8:
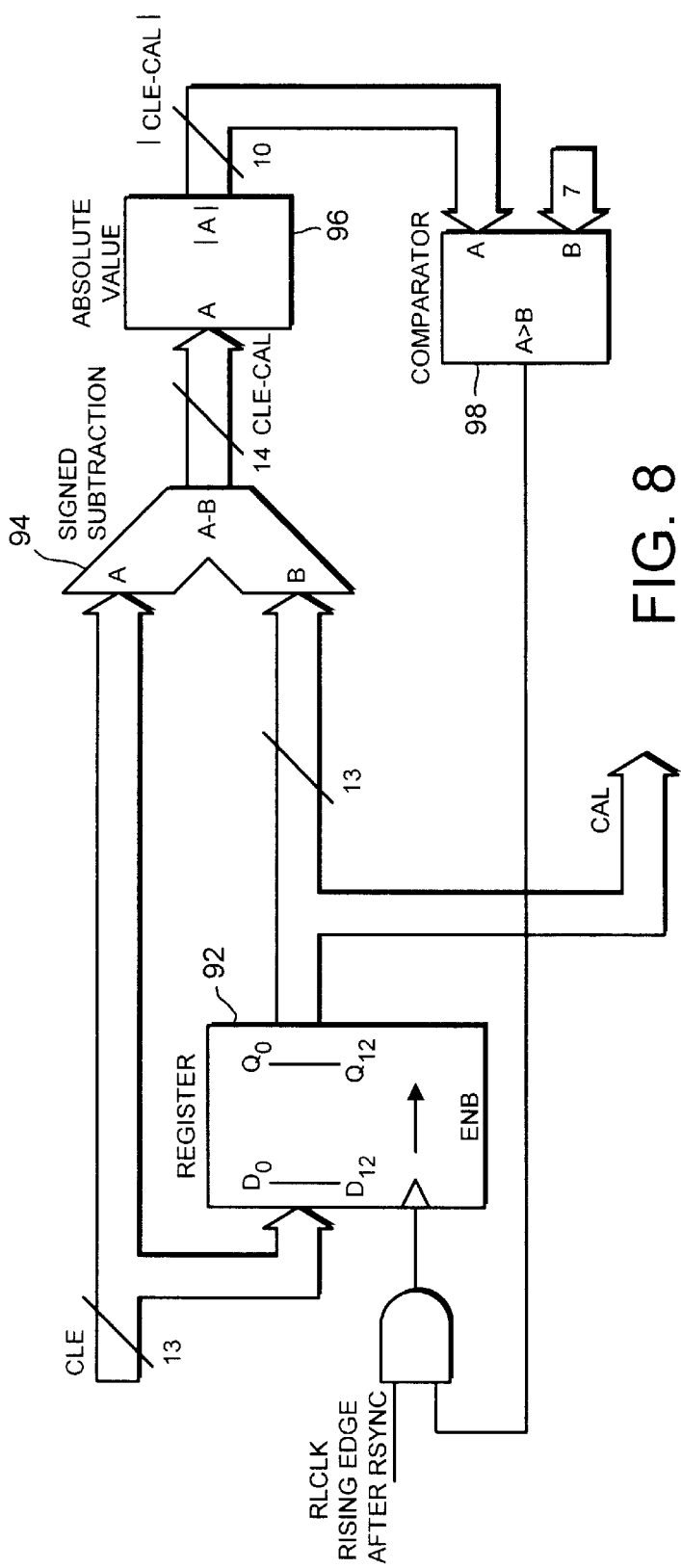
FIG. 8 is a schematic diagram of a part of a remote radio transceiver.

The AFO value is sent to a further loadable down counter (not shown in the drawings), which loads the AFO value, then counts down to 0, then loads the calibrated output CAL from the circuit of FIG. 8, then counts down to 0, and then sends a pulse to an AFS signal generator, to indicate that the time delay has expired.

Figure 10:
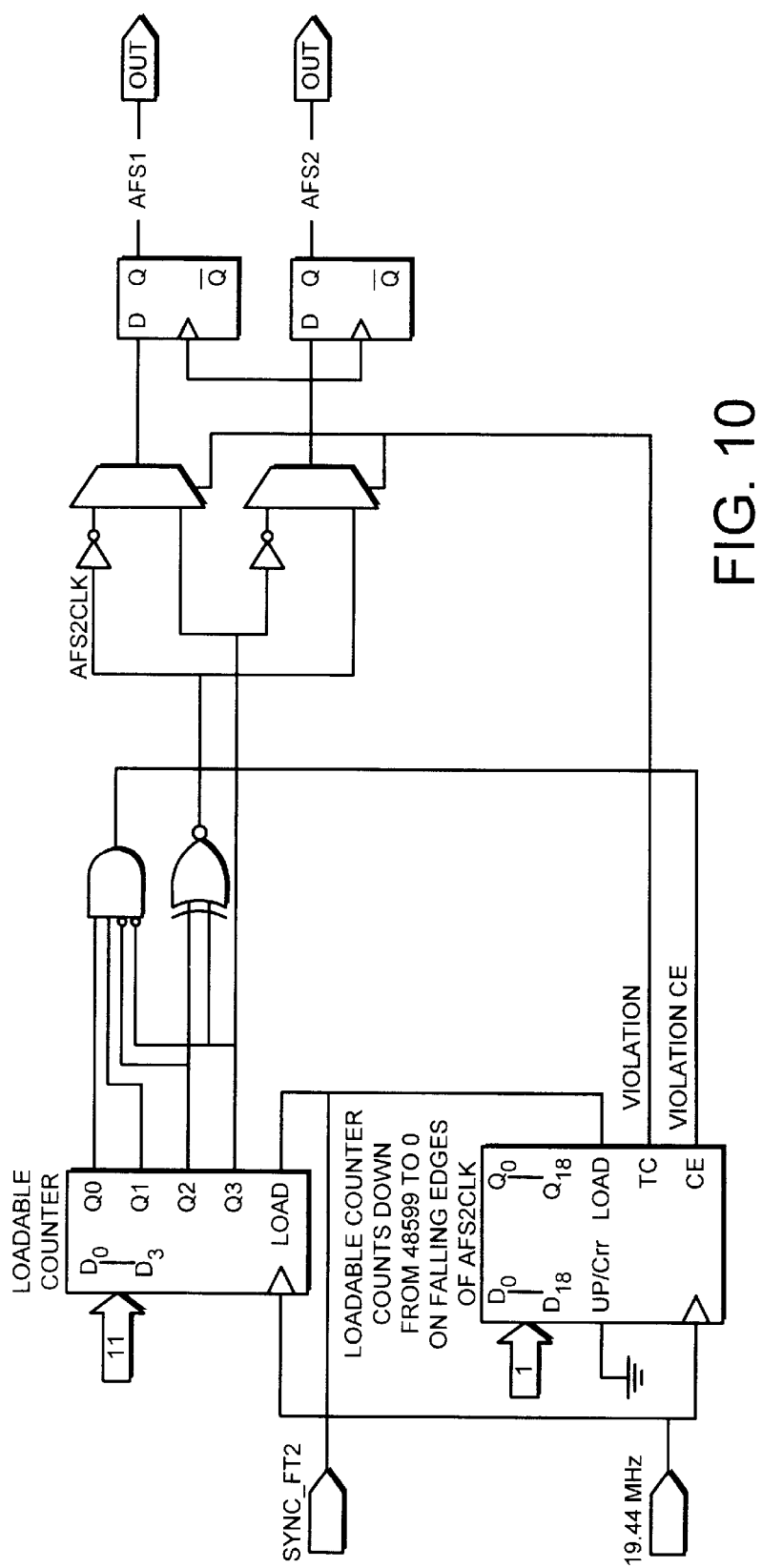
FIG. 10 is a schematic diagram of a still further part of a remote radio transceiver.

FIG. 10 shows the AFS signal generator, which generates the complete AFS signal, in the form which is known from the prior art. Frame time zero of the AFS signal appears 1.54 µs after receipt of the pulse from the loadable down counter.

There is thus disclosed an arrangement for distributing air frame synchronisation signals over a PCM link which is an existing resource in the communications network, and thus avoids the need for a separate cable network to distribute the timing signals.

What is claimed is:

1. In a communications network comprising a central unit and a plurality of remote radio transceivers, the central unit being connected to the remote radio transceivers by respective PCM links and being adapted to send data to said remote radio transceivers in frames, a method of establishing air frame synchronization between digital signals transmitted from the transceivers comprising:

generating an air frame synchronization signal at the central unit;

the air frame synchronisation signal having a phase relative to a phase of said frames of data;

encoding a data signal relating to said relative phase;

transmitting said encoded data signal on the PCM link form the central unit to each of the remote radio transceivers; and regenerating an air frame synchronization signal at each remote radio transceiver from the transmitted encoded data signal.

2. In a communication network comprising a central unit and a plurality of remote radio transceivers, the central unit being connected to the remote radio transceivers by respective PCM links, a method of establishing air frame synchronization between digital signals transmitted from the transceivers comprising the steps of:

generating an air frame synchronisation signal at the central unit;

transmitting data, relating to the air frame position of the air frame synchronisation signal, on the PCM link from the central unit to each of the remote radio transceivers; and regenerating an air frame synchronisation signal at each remote radio transceiver from the transmitted data;

wherein the step of transmitting data comprises generating a clock signal, and counting the number of clock cycles which separate the start of a frame in the air frame synchronisation signal from the start of a frame in the signal sent on the PCM link.

3. A method as claimed in claim 1, further comprising the step of transmitting data, relating to the air frame position of the air frame synchronisation signal, in one time slot of the signal sent on the PCM link.

4. A method as claimed in claim 2, wherein the step of transmitting data comprises transmitting the counted number of clock cycles as a data signal in one time slot of the signal sent on the PCM link.

5. A method as claimed in claim 1, wherein the frame rate on the PCM link is an integer multiple N of the air frame synchronisation signal frequency, the method comprising transmitting data relating to the air frame position of the air frame synchronisation signal in an integer number M of each N frames, the position of the M frames being determined by the frame of the PCM signal in which a frame of the air frame synchronisation signal begins, and the transmitted data being determined by the position in the frame of the PCM signal at which the frame of the air frame synchronisation signal begins.

6. A method as claimed in claim 1, wherein the step of regenerating the air frame synchronisation signal comprises decoding the transmitted data.

7. A method as claimed in claim 1, wherein the step of regenerating the air frame synchronisation signal comprises compensating for transmission delays.

8. A method as claimed in claim 7, wherein to determine transmission delay between the central unit and a remote radio transceiver the central unit and the remote radio transceiver are arranged to operate in a remote loopback arrangement to enable measurement of the combined transmission delay to and from the transceiver to the central unit.

9. In a communication network comprising a central unit and a plurality of remote radio transceivers, the central unit being connected to the remote radio transceivers by respective PCM links, a method of establishing air frame synchronization between digital signals transmitted from the transceivers comprising the steps of:

generating an air frame synchronisation signal at the central unit;

transmitting data, relating to the air frame position of the air frame synchronisation signal, on the PCM link from the central unit to each of the remote radio transceivers; and regenerating an air frame synchronisation signal at each remote radio transceiver from the transmitted data;

wherein the step of regenerating the air frame synchronisation signal comprises compensating for an elastic store depth at the remote transceivers.

10. A communications network comprising a central unit and a plurality of radio transceivers, the central unit comprising:

circuitry for generating an air frame synchronization signal, and an interface for transmitting a PCM data signal in frames to the radio transceivers, the air frame synchronization signal having a phase relative to a phase of said frames of data;

an encoder, for generating data relating to the phase of the air frame synchronisation signal relative to the phase of said frames of data; and means for transmitting said data, relating to the phase of the air frame synchronisation signal relative to the phase of said frames of data, to the radio transceivers:

each radio transceiver comprising:

circuitry for recreating the original air frame synchronization signal from the transmitted data.

11. A communications network comprising a central unit and a plurality of radio transceivers, the central unit comprising:

circuitry for generating an air frame synchronization signal, and an interface for transmitting a PCM signal to the radio transceivers, including transmitting data relating to the air frame position of the air frame synchronisation signal; and each radio transceiver comprising:

circuitry for recreating the original air frame synchronization signal from the transmitted data;

wherein the interface for transmitting data comprises circuitry for generating a clock signal, and counting the number of clock cyles which separate the start of a frame in the air frame synchronisation signal from the start of a frame in the signal sent on the PCM link.

12. A network as claimed in claim 10, comprising circuitry for transmitting data, relating to the air frame position of the air frame synchronisation signal, in one time slot of the signal sent on the PCM link.

13. A network as claimed in claim 10, wherein the interface for transmitting data comprises circuitry for transmitting the counted number of clock cycles as a data signal in one time slot of the signal sent on the PCM link.

14. A network as claimed in claim 10, wherein the frame rate on the PCM link is an integer multiple N of the air frame synchronisation signal frequency, the network comprising an interface for transmitting data relating to the air frame position of the air frame synchronisation signal in an integer number M of each N frames, the position of the M frame being determined by the frame of the PCM signal in which a frame of the air frame synchronisation signal begins, and the transmitted data being determined by the position in the frame of the PCM signal at which the frame of the air frame synchronisation signal begins.

15. A network as claimed in claim 10 wherein the circuitry for regenerating the air frame synchronisation signal comprises circuitry for decoding the transmitted data.

16. A network as claimed in claim 10, wherein the circuitry for regenerating the air frame synchronisation signal comprises means for compensating for transmission delays.

17. A communications network comprising a central unit and a plurality of radio transceivers, the central unit comprising:

circuitry for generating an air frame synchronization signal, and an interface for transmitting a PCM signal to the radio transceivers, including transmitting data relating to the air frame position of the air frame synchronisation signal; and each radio transceiver comprising:
circuitry for recreating the original air frame synchronization signal from the transmitted data;
wherein the circuitry for regenerating the air frame synchronisation signal comprises means for compensating for an elastic store depth at the remote transceivers.

18. A method of establishing air frame synchronization between a plurality of radio transceivers in a telecommunications network comprising a central unit connected to the radio transceivers by respective PCM links, the method comprising:
generating a master air frame synchronization signal at the central unit;
detecting edges in the master air frame synchronization signal;
allocating a timeslot in a frame on each PCM link to air frame synchronization messages;
including a signal in the timeslot allocated to air frame synchronization messages in the transmission on each PCM link, whenever an edge in the master air frame synchronization signal is detected; and
regenerating a slave air frame synchronization signal in each radio transceiver based on the signal in the transmission on the respective PCM link.

19. A method as claimed in claim 18, wherein the signal is included in the timeslot allocated to air frame synchronization messages in the frame having a known relation to the frame in which the edge in the master air frame synchronization signal is detected.

20. A method of establishing air frame synchronization between a plurality of radio transceivers in a telecommunications network comprising a central unit connected to the radio transceivers by respective PCM links, the method comprising:
generating a master air frame synchronization signal at the central unit;
detecting edges in the master air frame synchronization signal;
allocating a timeslot in a frame on each PCM link to air frame synchronization messages;
including a signal in the timeslot allocated to air frame synchronization messages in the transmission on each PCM link, whenever an edge in the master air frame synchronization signal is detected; and
regenerating a slave air frame synchronization signal in each radio transceiver based on the signal in the transmission on the respective PCM link;
wherein the signal indicates the position in the frame at which the edge in the master air frame synchronization signal is detected.

21. A method as claimed in claim 20, wherein the slave air frame synchronization signal regenerated in each radio transceiver has edges at positions based on the frame in which the signal appears in the transmission on the respective PCM link.

22. A method of establishing air frame synchronization between a plurality of radio transceivers in a telecommunications network comprising a central unit connected to the radio transceivers by respective PCM links, the method comprising:
generating a master air frame synchronization signal at the central unit;
detecting edges in the master air frame synchronization signal;
allocating a timeslot in a frame on each PCM link to air frame synchronization messages;
including a signal in the timeslot allocated to air frame synchronization messages in the transmission on each PCM link, whenever an edge in the master air frame synchronization signal is detected; and
regenerating a slave air frame synchronization signal in each radio transceiver based on the signal in the transmission on the respective PCM link;
wherein the signal is included in the timeslot allocated to air frame synchronization messages in the frame having a known relation to the frame in which the edge in the master air frame synchronization signal is detected; and
wherein the signal is included in the timeslot allocated to air frame synchronization messages in a plurality of frames having a known relation to the frame in which the edge in the master air frame synchronization signal is detected.

23. A method of establishing air frame synchronization between a plurality of radio transceivers in a telecommunications network comprising a central unit connected to the radio transceivers by respective PCM links, the method comprising:
generating a master air frame synchronization signal at the central unit;
detecting edges in the master air frame synchronization signal;
allocating a timeslot in a frame on each PCM link to air frame synchronization messages;
including a signal in the timeslot allocated to air frame synchronization messages in the transmission on each PCM link, whenever an edge in the master air frame synchronization signal is detected;
regenerating a slave air frame synchronization signal in each radio transceiver based on the signal in the transmission on the respective PCM link; and
allocating to air frame synchronization messages a sufficient number of bits in each frame to allow the edge positions to be indicated to a desired accuracy level.

24. A method of establishing air frame synchronization between a plurality of radio transceivers in a telecommunications network comprising a central unit connected to the radio transceivers by respective PCM links, the method comprising:
generating a master air frame synchronization signal at the central unit;
detecting edges in the master air frame synchronization signal;
allocating a timeslot in a frame on each PCM link to air frame synchronization messages;
including a signal in the timeslot allocated to air frame synchronization messages in the transmission on each PCM link, whenever an edge in the master air frame synchronization signal is detected; and
regenerating a slave air frame synchronization signal in each radio transceiver based on the signal in the transmission on the respective PCM link;
wherein the step of regenerating a slave air frame synchronization signal in each radio transceiver comprises:
receiving an indication that an AFS frame is about to begin;
compensating for delays in transmitting the message on the PCM link;

taking account of data transmitted on the PCM link concerning the start point of the AFS frame; and regenerating the slave air frame synchronization signal with its start point at a time which takes account of the compensation for delays in transmitting the message on the PCM link and the data transmitted on the PCM link.

25. A method of establishing air frame synchronization between a plurality of radio transceivers in a telecommunications network comprising a central unit connected to the radio transceivers by respective PCM links, the method comprising:

generating a master air frame synchronization signal at the central unit;

detecting edges in the master air frame synchronization signal;

allocating a timeslot in a frame on each PCM link to air frame synchronization messages;

including a signal in the timeslot allocated to air frame synchronization messages in the transmission on each PCM link, whenever an edge in the master air frame synchronization signal is detected; and regenerating a slave air frame synchronization signal in each radio transceiver based on the signal in the transmission on the respective PCM link;

generating a master air frame synchronization signal at the central unit, the central unit having a high speed clock;

detecting a start point of each frame in the master air frame synchronization signal;

calculating the period of the air frame synchronization signal as a multiple N of the PCM link frame period;

allocating a timeslot in each frame on each PCM link to air frame synchronization messages;

counting the delay in system clock periods between the start point of a frame on the PCM links and the start point of a frame in the master air frame synchronization signal and obtaining a count value;

transmitting the count value in the timeslot allocated to air frame synchronization messages of one or more frames on the PCM links, the first such frame being P frames after the frame in which the start point of the frame in the master air frame synchronisation signal is detected;

receiving transmissions on the respective PCM link in each radio transceiver; and regenerating a slave air frame synchronization signal in each radio transceiver with the start point of each frame at a point in time determined by the time of receipt of the first frame on the PCM link containing a transmitted count value, a known delay in the PCM link, and a number Q (Q=N−P), such that the start point of the frame in the slave air frame synchronization signal is exactly N frames after the start point of the frame in the master air frame synchronization signal.

26. A radio transceiver, having an interface for connection to a central unit by means of a PCM link, the transceiver comprising means for detecting air frame synchronization pointers in messages received on the PCM link, and means for regenerating an air frame synchronization signal based on the pointers.

27. A method of ensuring synchronization between radio transceivers in a cellular system comprising a central unit and a plurality of remote transceivers, the method comprising:

generating an AFS (Air Frame Synchronization) signal in the central unit;

the AFS signal having a phase relative to a phase of said frames of data;

encoding a data signal relating to said relative phase;

transmitting encoded data relating to the AFS signal over a PCM (Pulse Code Modulated) link from the central unit to the transceivers; and regenerating the AFS signal in the transceivers using the transmitted data.

28. A method as claimed in claim 27, wherein the data relating to the AFS signal is transmitted over a TDM link from the central unit to the transceivers.

29. A method as claimed in claim 27, wherein the step of regenerating the AFS signal comprises using the TDM link frame synchronization as a timing reference.

30. A method of ensuring synchronization between radio transceivers in a cellular system comprising a central unit and a plurality of remote transceivers, the method comprising:

generating an AFS signal in the central unit;

transmitting encoded data relating to the AFS signal over a PCM link from the central unit to the transceivers; and regenerating the AFS signal in the transceivers using the transmitted data;

wherein the step of transmitting data relating to the AFS signal comprises encoding data relating to the phase difference between the AFS frame and the TDM frame, and transmitting the enclosed data in a time slot on the TDM data link.

31. The method of claim 2, further comprising the step of transmitting data, relating to the air frame position of the air frame synchronisation signal, in one time slot of the signal sent on the PCM link.

32. A method as claimed in claim 2, wherein the frame rate on the PCM link is an integer multiple N of the air frame synchronisation signal frequency, the method comprising transmitting data relating to the air frame position of the air frame synchronisation signal in an integer number M of each N frames, the position of the M frames being determined by the frame of the PCM signal in which a frame of the air frame synchronisation signal begins, and the transmitted data being determined by the position in the frame of the PCM signal at which the frame of the air frame synchronisation signal begins.

33. A method as claimed in claim 2, wherein the step of regenerating the air frame synchronisation signal comprises decoding the transmitting data.

34. A method as claim in claim 2, wherein the step of regenerating the air frame synchronization signal comprises compensating for transmission delays.

35. A method as claimed in claim 2, wherein to determine transmission delay between the central unit and a remote radio transceiver the central unit and the remote radio transceiver are arranged to operate in a remote loopback arrangement to enable measurement of the combined transmission delay to and from the transceiver to the central unit.

36. A network as claimed in claim 11, comprising circuitry for transmitting data, relating to the air frame position of the air frame synchronisation signal, in one time slot of the signal sent on the PCM link.

37. A network as claimed in claim 11, wherein the interface for transmitting data comprises circuitry for transmitting the counted number of clock cycles as a data signal in one time slot of the signal sent on the PCM link.

38. A network as claimed in claim 11, wherein the frame rate on the PCM link is an integer multiple N of the air frame synchronisation signal frequency, the network comprising an interface for transmitting data relating to the air frame position of the air frame synchronisation signal in an integer number M of each N frames, the position of the M frame being determined by the frame of the PCM signal in which a frame of the air frame synchronisation signal begins, and the transmitted data being determined by the position in the frame of the PCM signal at which the frame of the air frame synchronisation signal begins.

39. A network as claimed in claim 11, wherein the circuitry for regenerating the air frame synchronisation signal comprises circuitry for decoding the transmitted data.

40. A network as claimed in claim 11, wherein the circuitry for regenerating the air frame synchronisation signal comprises means for compensating for transmission delays.

* * * * *